No. 874,300.  
PATENTED DEC. 17, 1907.  
A. A. CAILLE, G. HAMILTON & O. C. CURRIE.  
COIN CONTROLLED WEIGHING MACHINE.  
APPLICATION FILED SEPT. 11, 1905.
4 SHEETS—SHEET 1.
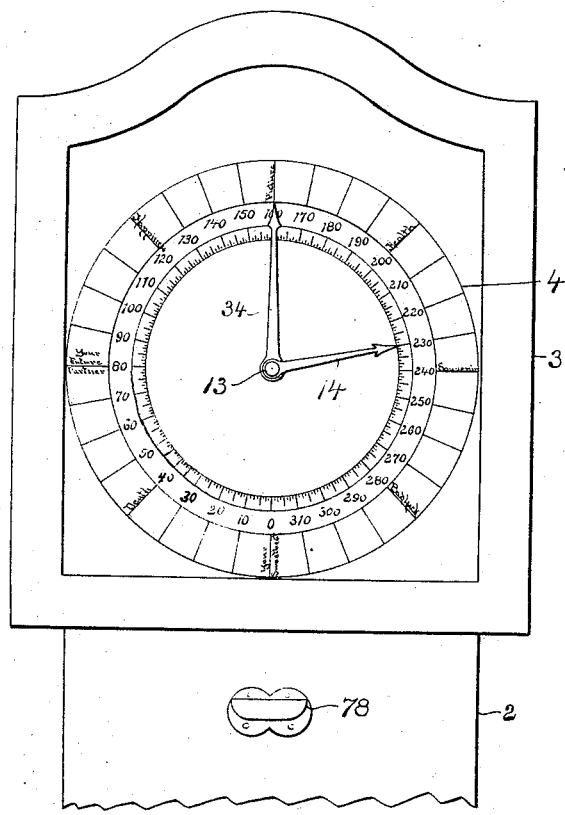
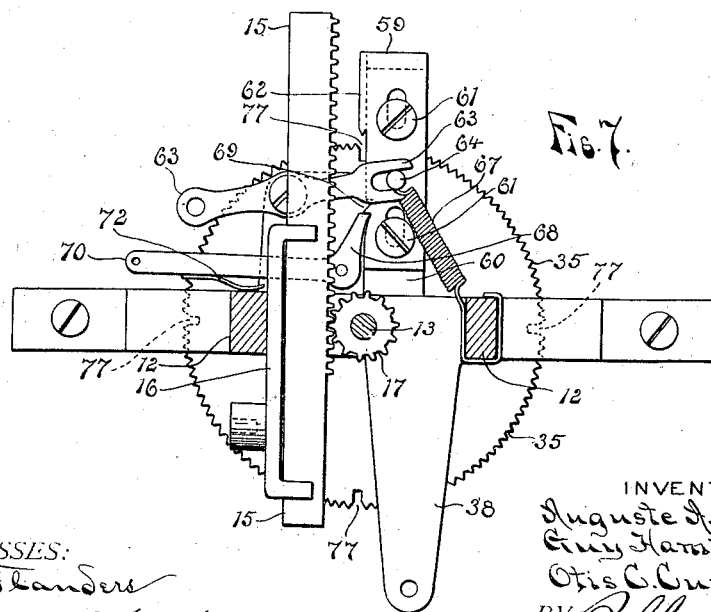
WITNESSES:  
INVENTORS:  
Auguste A. Caille  
Guy Hamilton  
Otis C. Currie  
BY  
ATTORNEYS.

No. 874,300. PATENTED DEC. 17, 1907.
A. A. CAILLE, G. HAMILTON & O. C. CURRIE.
COIN CONTROLLED WEIGHING MACHINE.
APPLICATION FILED SEPT. 11, 1905.
4 SHEETS—SHEET 2.
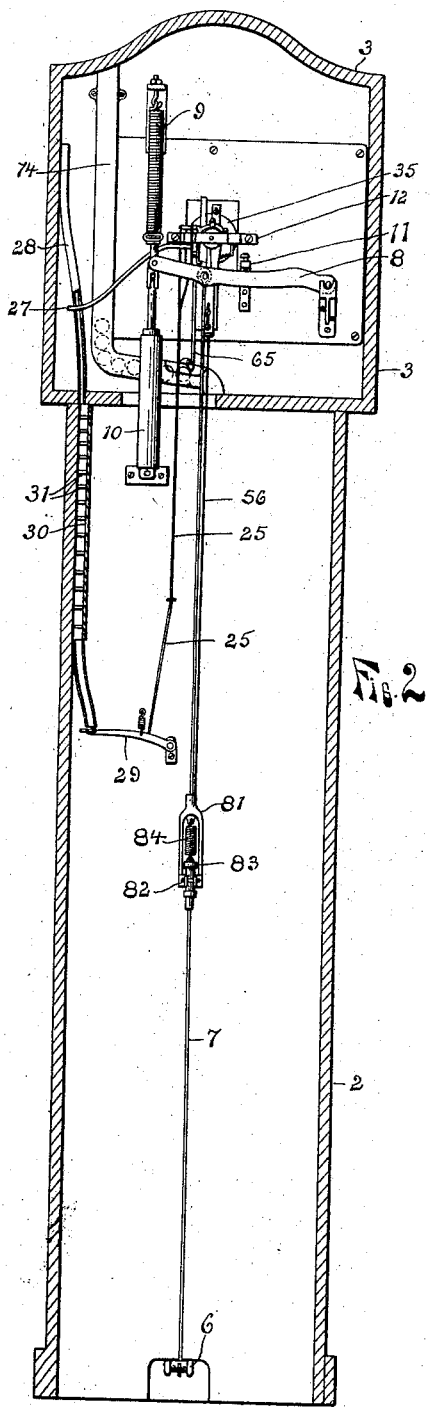
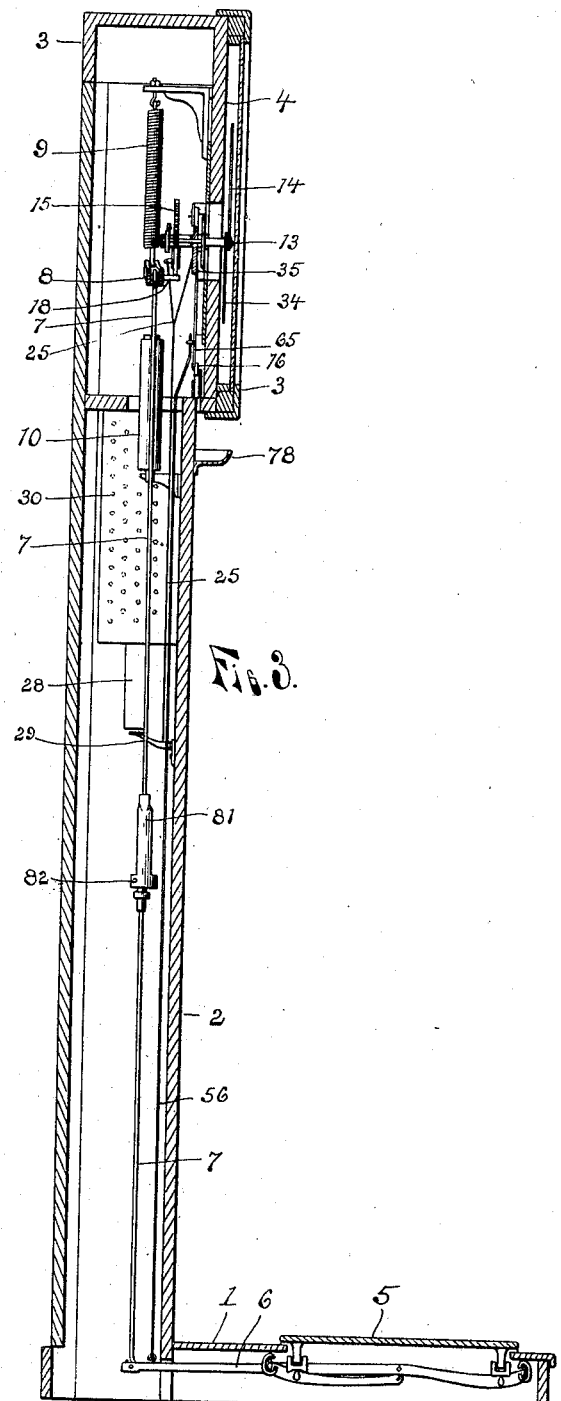

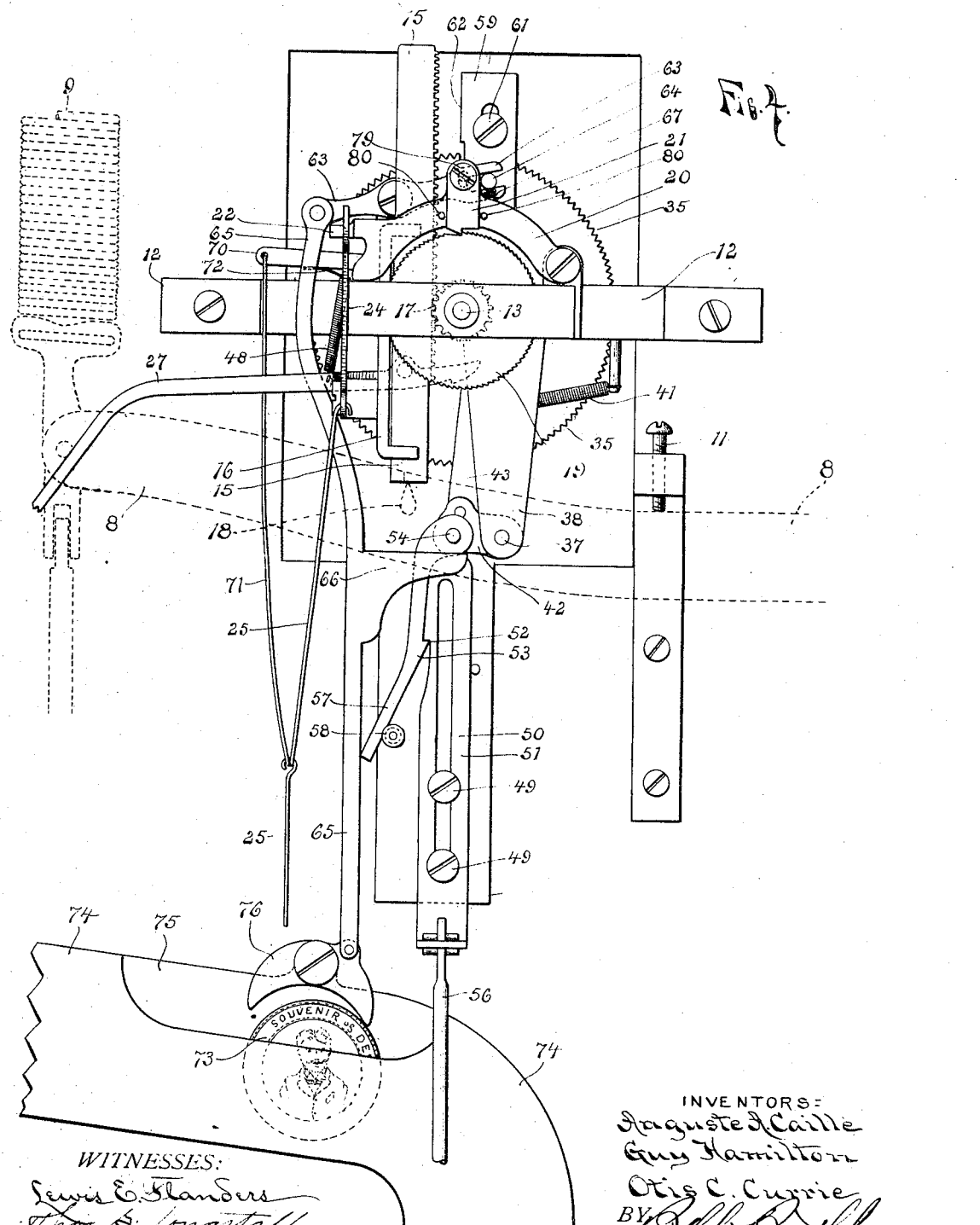

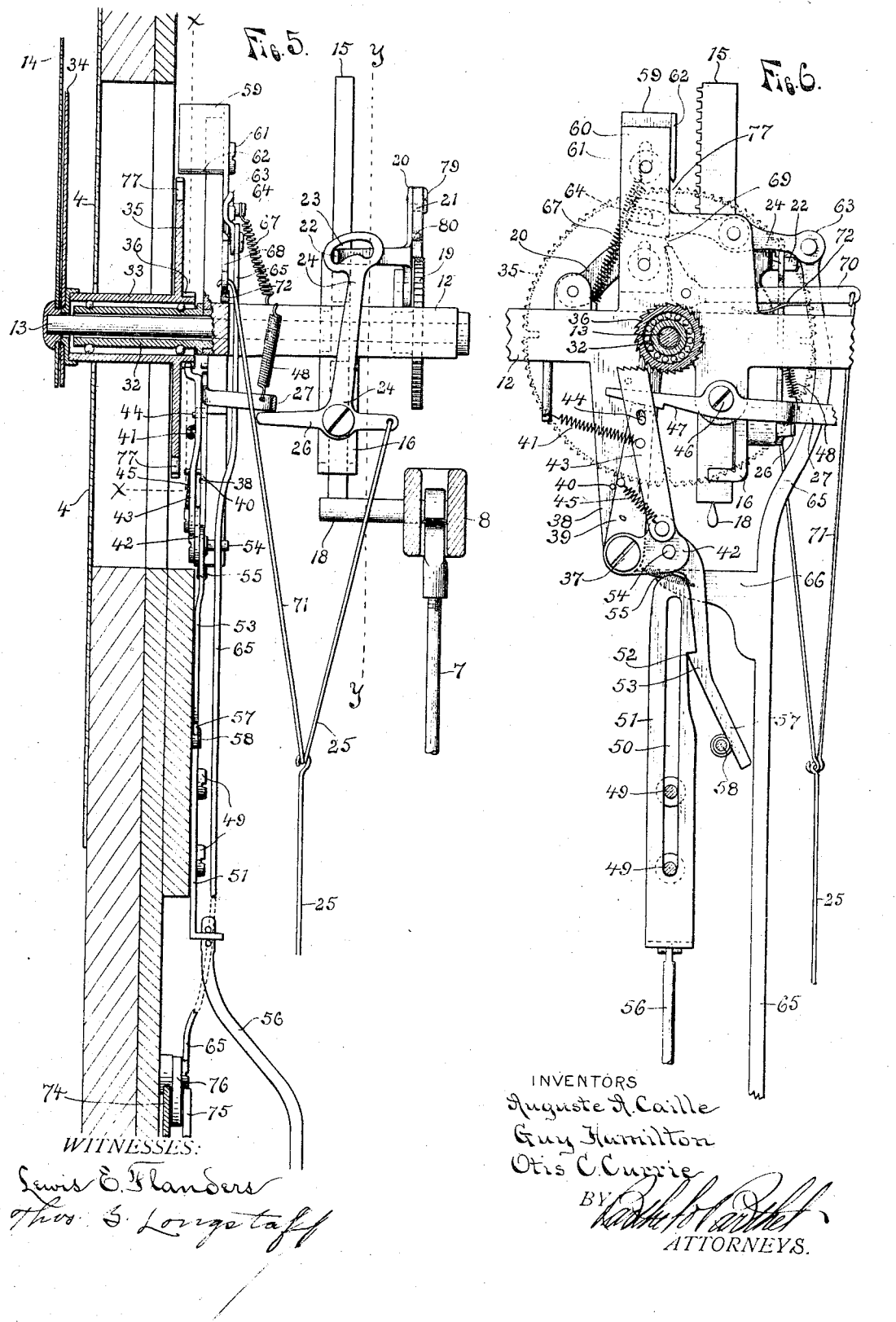

UNITED STATES PATENT OFFICE.

AUGUSTE A. CAILLE, GUY HAMILTON, AND OTIS C. CURRIE, OF DETROIT, MICHIGAN, ASSIGNORS TO THE CAILLE COMPANY, OF DETROIT, MICHIGAN, A COPARTNERSHIP.

COIN-CONTROLLED WEIGHING-MACHINE.

No. 874,300.　　　　Specification of Letters Patent.　　　　Patented Dec. 17, 1907.

Application filed September 11, 1905. Serial No. 277,902.

*To all whom it may concern:*

Be it known that we, AUGUSTE A. CAILLE, GUY HAMILTON, and OTIS C. CURRIE, all citizens of the United States of America, residing at Detroit, in the county of Wayne and State of Michigan, have invented certain new and useful Improvements in Coin - Controlled Weighing-Machines, of which the following is a specification, reference being had therein to the accompanying drawings.

This invention relates to improvements in coin-controlled weighing machines, and the object of the invention is to provide very simple, and efficient weighing mechanism designed to automatically indicate on a dial by means of a suitable hand the weight of the person or thing on the platform, and it is also an object of the invention to provide mechanism forming a part of, adapted to cooperate with, and to be actuated by the weighing mechanism, for spinning a hand over the face of the dial to point out one of a number of characters, words, phrases or other devices arranged on the dial for "fortune telling" or other purposes, opposite which the hand may happen to stop.

A further object of the invention is to provide means operated by the coin as it passes through its chute for automatically locking and unlocking the weighing hand and also the spinning hand; and to provide simple means for retarding the passage of the coin through its chute to give sufficient time, after said coin operates to unlock the locking mechanism, for the hand to spin and the scale to come to a balance before said coin will operate the locking mechanism to lock said hands.

It is also an object of the invention to provide mechanism forming a part of, operated by and automatically coöperating with the spinning and weighing mechanisms, for delivering, in accordance with the marking on the dial for the spinning hand, suitable pictures, photographs, advertising buttons, souvenirs or other pieces, the pictures or other distinguishing characters on which bear a certain relation to the words or markings on the dial.

It is further an object of the invention to provide the device with certain other new and useful features, all as more fully hereinafter described and particularly pointed out in the claims, reference being had to the accompanying drawings, in which Figure 1, is a front elevation of the upper portion or head of a device embodying the invention; Fig. 2, is a rear elevation of the device drawn to a smaller scale and showing the case in section; Fig. 3, is a longitudinal vertical section of Fig. 2; Fig. 4, is an enlarged detail of the operating mechanism in rear elevation; Fig. 5, is a central vertical section of Fig. 4; Fig. 6, is a sectional front elevation of Fig. 5 on the line $x$—$x$; and Fig. 7, is a section detail on the line $y$—$y$ of Fig. 5.

As shown in the drawings 1 is a suitable supporting base from the rear end of which rises a column 2 provided with a suitable head or casing 3 for a dial 4 in its front. A platform 5 is supported by the ordinary levers of a platform scale and extending upward in the column 2 from the long arm 6 of the weighing levers which projects into the lower end of the column is a pull rod 7 attached at its upper end to a weighing lever 8 one end of which is supported by a knife bearing on a bracket secured to the front of the casing 3 and the opposite end pivotally attached to the lower end of a coiled weighing spring 9 adjustably attached to a bracket on the casing. To prevent strains on the mechanism when a weight is suddenly placed on the platform a dash-pot 10 is attached to said lever 8 below the spring, and a stop 11 on the casing limits the upward movement of said lever.

Mounted in bearings upon a suitable supporting frame 12 secured to the front of the casing, is a shaft 13 which extends outward through said front in the axis of the dial and on this projecting end is secured a suitable pointer or hand 14 to indicate the weight of the person standing upon the platform. To actuate the shaft and turn the hand, a vertically movable rack 15 guided in a suitable guide bearing 16 on the frame, is provided to mesh with a pinion 17 on the shaft 13 and projecting from the inner side of the lever 8 is a pin 18 having a knife-edge, to engage the lower end of said rack and support the same. When the said lever is pulled downward by weight on the platform, it carries the pin 18 with it, thus permitting the rack to drop, and the indicating hand is thus turned by the weight of the falling rack, a distance proportionate to the fall of the lever, accurately indicating the pounds on the dial.

To prevent the indicating hand from being turned to indicate the weight except when a coin or check is dropped in, coin controlled locking means are provided consisting of a ratchet wheel 19 secured on the shaft 13, and a curved arm 20 pivoted at one end on the frame 12 adjacent to said ratchet and provided intermediate its ends with a suitable pawl 21 to engage the ratchet on its upper side. This pawl 21 is attached to its arm by a screw 79 or bolt passing through a slot in the pawl so that said pawl may move vertically or swing laterally, and on the arm at each side of the pawl and at a short distance therefrom, are pins 80 to guide the pawl and prevent its swinging but a very short distance. The number of notches in the ratchet wheel correspond to the number of pound marks on the dial, and therefore if the pawl was not permitted to swing, it would come down on top of a tooth when a half pound was indicated on the dial, and if not permitted to rise independently of the arm it would vibrate the arm and attached parts in slipping over the teeth in the backward turning of said ratchet. The free end of the arm 20 is provided with a projecting lug 22 to engage a curved slot 23 in the upper end of the upwardly extending arm of a bell-crank 24 pivoted on the frame, a pull rod 25 being attached to the outer end of the horizontally extending arm of said bell-crank to rock the same in one direction.

Extending horizontally outward from the pivot of the bell crank in a direction opposite to that of the arm to which the pull rod is secured is an arm 26 for rocking the bell crank in the opposite direction and a suitable long lever 27 is pivoted near one end on the frame and is normally engaged at its under side near said pivot by the arm 26. The long free end of this lever 27 projects into a slot in the coin chute 28 so that when a coin is dropped in it will engage the end of said lever and move the same downward, thus, by reason of the engagement of the arm 26 with its under side, rocking the bell crank. The slot 23 in the bell crank is arranged eccentric to its pivot so that when the bell crank is rocked by the long lever 27 as described the lug 22 will be raised slightly by its travel to the high end of said slot and thus the pawl 21 will be raised out of engagement with its ratchet wheel, releasing the same and permitting the rack to drop and turn the indicator shaft.

The pawl 21 is thus held out of engagement with its ratchet by the bell crank until said bell crank is rocked in the opposite direction to the position shown in Fig. 5, by an operating lever 29 (shown in Figs. 2 and 3) pivoted at one end to the forward wall of the column with its free end extending beneath the lower end of the coin chute, the pull rod 25 being attached thereto intermediate its ends so that when the coin drops from the chute it will move the lever 29 and cause a pull on a rod which will rock the bell-crank and permit the pawl to engage its ratchet to hold the hand in the position to which it has been turned. When the weight is taken from the platform, the lever 8 will be raised by the weighing spring and the pin 18 engaging the lower end of the rack will raise the same and turn the indicator to zero, the pawl slipping over the teeth of the ratchet.

To give the weighing mechanism time to come to a balance and the indicating hand to turn to its proper position after it has been released by the long lever 27, before said hand is again locked by the operation of the lever 29, means are provided in the coin chute for retarding the passage of the coin therethrough consisting of a lateral enlargement 30 of the chute in which enlargement pins 31 extending transversely of the chute are set haphazardly so that the coin entering the upper end of the enlargement will strike the pins and be deflected and retarded thereby.

Rigidly secured to the frame at one end is a hollow shaft 32 through which the end of the indicator shaft 13 projects, this fixed shaft also projecting through the axis of the dial, and on this hollow shaft is mounted a hub 33 with balls interposed so that the hub will turn on the shaft with as little friction as possible. Secured to the outer end of the hub is a hand or pointer 34 and on the inner end thereof adjacent to the supporting frame is a large ratchet wheel 35 and at the inner side of this large ratchet, a small ratchet or toothed gear 36. Pivoted at 37 to the lower end of a downwardly extending supporting arm 38 on the frame, is a carrying lever 39 normally held against a stop pin 40 on the supporting arm by a coiled spring 41, to extend upwardly toward the toothed gear, and turning upon the same pivot 37 is a short arm 42 extending laterally from the pivot and to the free end of which is pivotally attached an upwardly extending bar 43 having teeth on its upper end to engage the teeth of the toothed gear. This toothed bar is attached intermediate its ends to the upper end of the carrying lever by a pin 44 on said lever engaging a slot in the bar so that there is a slight relative or sliding movement between the two, and a coiled spring 45 attached at one end to the carrying lever and at its opposite end to the outer end of the short arm 42, normally holds said arm and bar raised relative to the carrying lever with the pin in the lower end of its slot.

The long operating lever 27 before mentioned, is pivoted at 46 on the frame and is formed with an end projecting beyond its pivot, forming a hook 47 extending in contact with the upper end of the carrying lever 39, the same being normally held in such contact and its opposite long end raised in the slot of the coin chute by a spring 48.

Secured to a suitable plate on the front side of the casing directly below the free end of the short arm 42 by screws 49 passing through a longitudinal slot 50, is a vertically movable slide 51 having a notch 52 in one edge with which a suitable hook 53 pivoted upon a stud 54 on the free end of said arm 42, is normally held in engagement by a coiled spring 55 attached at one end to said arm and at its opposite end to the hook. An operating rod 56 is attached at its upper end to the lower end of this slide 51 and at its lower end to the projecting end of the long arm of the weighing levers 6, and on the hook 53 is a downwardly extending tail piece 57 forming an inclined face to engage the stud 58 so that when the hook is drawn down by its engagement with the notch on the slide, this incline will turn the hook on its pivot and disengage it from said notch, after a certain downward movement of the hook has taken place.

Weight being placed on the platform by the operator standing thereon or otherwise, the long arm of the platform levers 6 will be depressed pulling down on the rod 56 and moving the slide downward. By the engagement of the slide with the hook 53 carried by the short arm 42, said arm will be turned on its pivot by the downward movement of the slide, the toothed bar moving relative to the carrying lever against the action of the spring 45 until the pin 44 engages the upper end of its slot. The carrying lever will then be turned on its pivot with said arm and bar, by the engagement of the pin with the upper end of its slot, until the hook 47 hooks over its upper end and the hook 53 is disengaged by the stud 58 from said slide, said lever being thus held in the position to which it is thus turned by the lever 27, until released by the dropping of a coin in the chute, which coin will rock the lever and disengage its hook 47 from said carrying lever. As soon as the hook 53 is disengaged from the slide and while the lever 39 is still held by the hook 47, the toothed bar is raised relative to said lever by the spring 45 so that when the said lever 39 is released by the operation of the lever 27 and quickly turned on its pivot by the spring 41 carrying with it said bar, the teeth on the bar will engage the toothed gear and turn the same. The stop 40 is so placed that when the carrying lever comes in contact therewith the toothed bar will be out of engagement with the pinion and therefore when said lever is released by the hook 47, the teeth on the bar suddenly engage the gear to give impetus thereto and quickly pass out of engagement therewith to permit the hub carrying the indicating hand 34 and upon which the gear is formed, to spin freely.

In order that the spinning mechanism may be set up by the downward movement of the
platform lever 6 without affecting the accu-
racy with which the weight will be indicated, the pull rod 7 is made in two parts and on the lower end of the upper part is secured a casting 81 formed with projecting ears 82 at its lower end between which the upper end of the lower part of the rod is adapted to move longitudinally. On this upper end is a head 83 adapted to engage the said ears, and a coiled spring 84 secured to the head at its lower end and to the casting 81 at its upper end normally holds the head out of contact with the ears, so that when weight is put upon the platform and the lever 6 depressed, the spring 84, being lighter than the weighing spring 9, will yield allowing said lever 6 to move downward without moving the weighing lever 8 until the head engages the ears. This first movement of the platform lever is sufficient to turn the carrying lever of the spinning mechanism into engagement with its hook and disengage the hook 53 from the slide, and thus when the pull comes on the weighing lever, the pull rod for the spinning mechanism is free and can not affect the accurate operation of the weighing mechanism.

The peripheral margin of the dial 4 outside the weight indicating numbers may be divided into any number of equal spaces, and certain of these spaces may be marked with distinguishing words or characters, as shown, or the divisions may all have letters, figures, words, phrases, sentences, pictures or other devices each of which will have a certain meaning to the operator when pointed out by the spinning hand, as, for instance, "fortune telling" words or phrases; and it is desirable that the spinning hand when it stops, should point to some one of these divisions. It is also desirable that the time which the hand may spin, be limited so that it will stop at the same time that the weighing operation is completed; and to do this a vertically movable slide 59 is secured to a vertical post 60 on the frame by screws 61 extending through slots in the slide and on the slide is formed a suitable dog or detent 62 adapted to engage the notches in the periphery of the large ratchet wheel 35 which wheel is secured on the hub to which the spinning hand is attached. This slide is moved vertically to raise the detent out of contact with its ratchet to permit the hand to spin, by a lever 63 pivoted intermediate its ends on the frame and provided with a slot extending inward from one end to receive a pin 64 on the slide. To the opposite end of said lever is pivotally attached a downwardly extending rod 65 provided with a shoulder or arm 66 which extends laterally therefrom, below and into the path of the stud 54 on the arm 42 of the spinning mechanism, so that when said arm is pulled downward by the placing of weight upon the platform, as before described, the rod 65 will be moved by the engagement of said stud with the arm and the lever 63 will be turned on its pivot, lifting the slide to the upper end of its movement against the action of a coiled spring 67 attached at one end to said slide and at its opposite end to the frame. The slide is held in this raised position to permit the ratchet 35 to spin, by a pawl 68 pivoted on the frame adjacent to the lower end of the post 60 and adapted to engage notches 69 in one edge of the slide. This pawl is formed with a long arm 70 extending outward therefrom to the outer end of which a pull rod 71 is attached to turn the pawl in one direction to release the slide, said pawl being normally held in contact with the slide by a spring 72 inserted between said arm and the frame. The pull rod 71 is attached at its lower end to the pull rod 25 which is actuated by the operating lever 29, and thus when the coin drops from the chute and turns said lever, the pawl 68 will be disengaged from the slide permitting the detent 62 to engage and stop the spinning of the ratchet 35 at the same time that the bell crank 24 is turned to permit the pawl 21 to engage its ratchet wheel and lock the weight indicating hand.

Another attractive feature of this weighing machine, and one which is especially adapted to automatically coöperate therewith and with the "fortune telling" dial and its spinning hand, is mechanism whereby a suitable constructed picture of the operator's "future husband" or "future wife" is delivered when the hand stops upon certain indicated points on the dial, or these articles may, if desired, be in the form of souvenir pocket pieces stamped from metal or other suitable material having imprinted thereon an advertisement or other device. Where pictures or photographs are used, advertising or other matter is preferably printed thereon and they are also preferably made of a material or in such a manner that they will form appropriate souvenirs of the place and be handy to carry in the pocket, but in either instance the souvenirs will have no intrinsic value. As being the most desirable shape and the easiest to handle in the machine, these souvenirs 73 are preferably made in the form of small disks and secured to the front side of the case is a way or chute 74 to hold these articles. The upper side of this chute is cut away at 75 opposite the downwardly extending lower end of the rod 65 so that one edge of the souvenir pieces will project therefrom as they pass down the chute, and pivoted intermediate its ends in a position to engage the souvenirs, is a crescent shaped double pawl 76 operated by said rod 65 which is pivotally attached thereto at one side of its pivot. This double pawl is so made that when rocked on its pivot it will permit only one of the souvenir pieces to pass at a time, and the parts are so proportioned that when the detent 62 falls into engagement with the teeth on the periphery of the ratchet 35, the throw of the lever 63 will not be sufficient to rock the pawl 76 far enough to permit the souvenir to pass, but at desired intervals in the edge of said ratchet wheel radial slots 77 are formed, and when the detent drops into one of these slots the slide is permitted to drop sufficiently to rock the pawl far enough to allow a souvenir piece to pass on down the chute and out through the front of the case into a suitable cup 78 in front of the person standing on the platform.

The weighing mechanism is very simple in its construction and not liable to get out of order or become broken as the indicating mechanism is entirely disconnected from the pull rod and its weighing lever and normally locked to hold it out of contact therewith, therefore jumping upon the platform can not injure the parts. By combining with the weighing mechanism, the spinning hand and souvenir delivery in such a manner that all will automatically operate by simply stepping upon the platform and dropping in a coin, the scale is made very attractive.

Having thus fully described my invention, what I claim is:—

1. The combination with coin controlled mechanism, of a spinning hand, means for actuating the spinning hand and permitting the same to turn freely separate means for moving the hand actuating means into one position, means operated by the coin which coin also operates the coin controlled mechanism, for releasing from said position the means for actuating the spinning hand, and mechanism released by said coin for stopping the spinning of said hand.

2. The combination with coin controlled mechanism, of locking means to prevent the actuation of the mechanism, a spinning hand, means for actuating the spinning hand, and a lever adapted to be turned by a coin to unlock the locking means and to release the means for actuating the spinning hand.

3. The combination with an indicating hand, and mechanism for turning the same, of locking mechanism to prevent the turning of the indicating hand, a spinning hand, means for actuating the spinning hand, means adapted to be operated by a coin for unlocking the locking mechanism and for releasing the means for actuating the spinning hand to permit the same to turn said hand, and mechanism automatically operated by the same coin for stopping the spinning of the hand.

4. The combination with an indicating hand and mechanism for turning the same, of locking mechanism to prevent the turning of the indicator hand, a spinning hand, means for actuating the spinning hand, a spring to actuate said means, a lever adapted to be engaged and operated by a coin to unlock the locking mechanism and release said spring, means for stopping and holding the spinning hand, and a lever adapted to be operated by the coin after said coin has operated the first lever to lock the locking mechanism and to release the means for stopping and holding the spinning hand.

5. The combination with coin controlled mechanism and means for locking the same, of a spinning member, means for actuating said member and permitting the same to spin freely, means for stopping the spinning member, and means operated by a coin for simultaneously operating the locking means and releasing the stopping means.

6. The combination with a spinning member and means for actuating the same, of coin actuated means for releasing the actuating means, mechanism for delivering an article, stop mechanism to stop the spinning connected to the delivery mechanism to actuate the same, and means for releasing the stop mechanism operated by the same coin which actuates the means for releasing the actuating means for the spinning member.

7. The combination with coin controlled mechanism, of a spinning hand, mechanism for delivering an article, locking mechanism for the coin controlled mechanism, means controlling the operation of the delivery mechanism, and means adapted to be operated by a coin for releasing said locking mechanism and the means for controlling the delivery mechanism.

8. The combination with coin controlled mechanism, a spinning hand, means for spinning said hand, locking mechanism for the coin controlled mechanism, and means adapted to be operated by a coin for simultaneously unlocking the locking mechanism and releasing the means for spinning the hand.

9. The combination with coin controlled mechanism, of a spinning hand, means for spinning the hand, locking means for the coin controlled mechanism, a lever adapted to be moved by a coin to unlock the locking means and release the spinning means, locking means for the spinning hand, and a second lever adapted to be operated by the coin to cause the locking of the locking means for the coin controlled mechanism and the operation of the locking means for the hand.

10. The combination with coin controlled mechanism, of locking means for said mechanism, a spinning hand, locking means for the spinning hand, mechanism for delivering an article actuated by the movement of the locking means for the spinning hand, and means adapted to be moved by a coin to release the locking mechanism to lock the hands and operate the delivery mechanism.

11. The combination with coin controlled mechanism and locking means therefor, of a spinning hand, means for spinning said hand, means operated by a coin for unlocking the locking means and releasing the spinning means, mechanism for delivering an article, operating means for the delivery mechanism, and means operated by a coin for locking the locking means, and releasing the operating means for the delivery mechanism.

12. In a coin controlled mechanism, the combination of a coin chute, means within said chute for retarding the passage of a coin therethrough, a spinning hand, means for spinning said hand, a member normally preventing the operation of said means and projecting into the chute above the retarding means to be operated by a coin to release the said spinning means, means for stopping the spinning of the hand, and a member projecting into the chute below the retarding means adapted to be operated by the coin to release the stopping means.

13. The combination with coin controlled mechanism, and means for locking the same, of a spinning hand, means for spinning said hand, a coin chute having a laterally enlarged portion, pins extending across the chute in said portion to retard the coin, a lever projecting into the chute above the enlargement and adapted to release the spinning means and unlock the locking means, and a lever projecting into the chute below the enlargement to lock the locking means.

14. In a coin controlled weighing scale, the combination with a weighing lever adapted to be moved vertically by the weight of the thing to be weighed, of a horizontally extending shaft, an indicating hand on said shaft, a pinion on the shaft, a vertically guided gravity rack engaging the pinion and adapted to be raised by the upward movement of the weighing lever, a ratchet wheel on the shaft, a pawl to engage the ratchet, means for raising the pawl out of engagement with the ratchet and lowering the same into engagement therewith, a lever adapted to be turned by a coin to operate said means to raise the pawl, and a lever adapted to be turned by a coin to operate said means to lower the pawl into engagement with its ratchet.

15. In a coin controlled weighing scale, the combination with platform levers and a weighing lever connected with one of said levers, of an indicating hand, means operated by the weighing lever to turn the hand, coin operated means for locking said means to prevent the turning of the hand, a spinning hand, spinning mechanism for said hand, mechanism for delivering an article, means the operation of which is controlled by the spinning hand for controlling the operation of the delivery mechanism, actuating means connected to the platform lever to move the spinning mechanism and to actuate the controlling means, and coin operated means for releasing the spinning mechanism.

16. The combination with coin controlled mechanism and means for actuating the same, of a spinning hand, a toothed gear to turn said hand, a carrying lever pivoted at one end to a support, a short arm turning upon said pivot, a bar pivoted at one end to the end of the short arm and provided with teeth on its upper end to engage the gear, means connecting the carrying lever and bar and adapted to permit a relative movement between said bar and lever, a spring to turn the carrying lever on its pivot, and means connected to the means for actuating the coin controlled mechanism for turning the carrying lever against the action of the spring and moving said bar and lever relatively.

17. In a coin controlled weighing scale, the combination with an indicating hand, weighing mechanism for turning said hand and a vertically movable lever moved by weight placed on the scale, of a spinning hand, a toothed gear to turn said hand, a carrying lever pivoted at one end, a short arm turning on said pivot and extending laterally therefrom, a bar pivoted to the outer end of said arm at one end and provided with teeth at its opposite end, a pin on the carrying lever engaging a slot in the bar, a stop for the carrying lever, a spring to normally hold said lever against its stop with the teeth of the bar out of contact with the gear, means connecting the said vertically movable lever with the short arm to turn the lever arm and bar on their pivots, and coin controlled releasing mechanism for the spinning hand.

18. In a coin controlled weighing scale, the combination with platform levers, an indicating hand, mechanism actuated by the levers for turning the hand, and locking means for the hand; of a spinning hand, a toothed gear to turn said hand, a carrying lever pivoted at one end below said gear, a short arm turning upon the pivot of the lever, a bar pivoted at one end to the free end of said arm and provided with teeth at its opposite end to engage the gear, a stop for the carrying lever, a spring to normally hold said lever against its stop with the teeth on the bar out of contact with the gear, a pin on the carrying lever engaging a longitudinal slot in the bar, a hook pivoted to the end of the short arm, a slide having a notch to engage said hook and connected to one of the platform levers to be moved vertically thereby, means for disengaging the hook from the notch, and a lever having a hook to engage the upper end of the carrying lever when the same is turned against the action of the spring, and adapted to be operated by a coin and to release the locking means for the indicating hand.

19. The combination with coin controlled mechanism embodying a vertically movable weighing lever, of a chute, a double pawl pivoted to project into the chute and adapted to be rocked on its pivot to allow articles in the chute to pass one at a time, a rod pivotally connected to said double pawl to rock the same and vertically movable means to which the upper end of the rod is attached, adapted to be moved through intervening mechanism by the vertically movable lever.

20. In a coin controlled weighing scale, the combination with platform levers, of an indicating hand, mechanism for turning said hand, coin controlled locking mechanism for said turning mechanism, a spinning hand, spinning mechanism to turn said hand, coin released means for operating said spinning mechanism, a rod connecting one of the platform levers with said operating mechanism, a weighing lever for operating the mechanism for turning the hand, a rod connecting the weighing lever and the platform lever and made in two parts and means connecting the adjacent ends of the parts of the rod to permit said platform lever to be moved a short distance before the weighing lever will be moved thereby.

21. In a coin controlled weighing scale, the combination with a weighing lever, of a horizontal shaft, an indicating hand on said shaft, mechanism actuated by the weighing lever for turning said shaft, a hub on the shaft, a spinning hand on the hub, spinning mechanism to turn the hub, locking means for the shaft, and a coin operated lever for releasing the spinning mechanism and for operating the locking mechanism.

22. In a coin controlled weighing scale, the combination with a weighing lever, of a horizontally extending shaft, an indicating hand on said shaft, means for turning the shaft actuated by said weighing lever, a ratchet wheel on the shaft, an arm pivoted at one end and provided with a lug at its opposite end, a pawl carried by the arm to engage the ratchet, a bell-crank the upwardly extending arm of which is provided with a slot for the said lug arranged eccentric to its pivot, a horizontal arm on the bell crank extending outward from its pivot in a direction opposite to that of the lower arm of the bell crank, a lever adapted to be operated by a coin to turn the bell crank in one direction and lift the arm carrying the pawl, and a lever adapted to be operated by a coin for turning the bell crank in the opposite direction to lower the arm and engage the pawl with the ratchet.

23. The combination with coin controlled mechanism, of a vertically movable lever to operate said mechanism, a spinning hand, spinning mechanism to turn said hand operated by said lever, a large ratchet wheel to turn with said hand and provided with radial slots and notches in its periphery, a vertically movable detent to engage said slots and notches, mechanism for delivering an article connected with the detent to move therewith to deliver an article when the detent enters a slot, and coin operated means for releasing the detent.

24. The combination with a vertically movable lever, of a spinning hand, spinning mechanism to turn said hand, means attached to the said lever for engaging and operating the spinning mechanism, a large ratchet wheel connected to said spinning hand to turn therewith and having notches and radial slots in its periphery, a vertically movable slide having a detent to engage the notches and slots, mechanism for delivering an article, a rod connecting said mechanism with the slide, an arm on the rod adapted to be engaged by the spinning mechanism to move said rod and raise the slide, a spring to move the slide in the opposite direction, and coin controlled means for locking and releasing the slide.

25. In a coin controlled weighing scale, the combination with platform levers and a weighing lever connected to one of said levers to be moved thereby, of a horizontally extending shaft, an indicating hand on said shaft, means operated by the weighing lever for turning said shaft, a hub revoluble upon the shaft, a spinning hand on said hub, a large ratchet wheel on the hub having notches and slots in its periphery, a toothed gear on the hub adjacent to the large ratchet, spinning mechanism adapted to engage the gear and spin the hub and hand, a vertically movable slide having a detent to engage the slots and notches in the large ratchet wheel, a lever pivoted intermediate its ends and attached at one end to the slide, a rod attached to the opposite end of said lever, an outwardly extending stud carried by a vertically movable part of the spinning mechanism, an arm on the rod to engage said stud, a spring to move the slide downward, a pawl to engage and hold the slide raised, an arm on the pawl adapted to be moved by a coin to release the slide, an operating hook on the spinning mechanism, a pull rod connected to the platform lever, and a slide attached to the upper end of said rod to engage the hook.

26. In a coin controlled weighing scale, the combination with platform levers and a weighing lever connected to one of said levers to be moved thereby, of a horizontally extending shaft, an indicating hand on said shaft, locking mechanism for the shaft, a lever to operate said locking mechanism having two horizontal arms extending in opposite directions to rock said lever, a spinning hand, a toothed gear to turn said hand, spinning mechanism to engage and turn said gear, a spring to turn said mechanism in one direction, a vertically movable slide connected to one of the platform levers and provided with a notch in one side, a hook carried by the spinning mechanism to engage the notch on the slide, a tail piece on the hook having an inclined side, a fixed stud to engage the incline and disengage the hook from the slide, a long lever adapted to be operated by a coin and to engage one of the arms on the lever for operating the locking means for the shaft, a hook on said lever to engage the spinning mechanism and hold the same when turned against the action of its spring, locking means for the spinning hand operated in one direction by a spring, means for operating said locking means in the other direction actuated by the movement of the spinning means, a pawl to hold said locking means in an inoperative position, a long arm on said pawl, a lever adapted to be turned by a coin, and a rod connecting said lever with said long arm on the pawl and with one of the arms on the operating lever for the locking means for the shaft.

In testimony whereof we affix our signatures in presence of two witnesses.

AUGUSTE A. CAILLE.
GUY HAMILTON.
OTIS C. CURRIE.

Witnesses:
W. W. Steele,
Walter E. Whelan.